Patented Dec. 27, 1949

2,492,419

UNITED STATES PATENT OFFICE 2,492,419

PLASTICIZED VINYL CHLORIDE COPOLYMERS

Cecil W. Gayler, Ridley Park, Pa., assignor to American Viscose Corporation, Wilmington, Del., a corporation of Delaware No Drawing. Application July 12, 1945, Serial No. 604,720

9 Claims. (Cl. 260—33.4)

The present invention is concerned with compositions of matter comprising copolymers of vinyl chloride with acrylonitrile and plasticizers therefor.

Copolymers of vinyl chloride with acrylonitrile having molecular weights of 10,000 to 25,000 and in which the proportion of the latter constituent exceeds 10%, such as those containing from 10 to 55% thereof have a considerably raised softening point as compared to polyvinyl chlorides, but they are subject to severe deterioration and decomposition when fused. This results in the production of discolored, brittle, and weak molded and extruded products, particularly the latter, such as filaments, rods, tubes and the like, because of the necessity to have the material extruded in a highly fluid condition.

Such compounds as phenol itself and dibutyl sebacate which are highly satisfactory plasticizers for polyvinyl chlorides have been found to be unsuitable for the acrylonitrile copolymers with vinyl chloride. Those copolymers which have from 35 to 55% acrylonitrile therein are the most advantageous for the production of molded and extruded articles, and particularly filaments, because of their high softening points. However, while a few volatile solvents have been found which dissolve such copolymers, nevertheless no high-boiling plasticizer for them has heretofore been known.

In accordance with the present invention it has been found that certain halogenated and alkylated phenols are compatible with and serve as plasticizers for the vinyl chloride-acrylonitrile copolymers, and at the same time have the remarkable effect, when compounded in low proportions of about 2 to 10% on the combined weights of the resin and plasticizer, of stabilizing against heat, hardening, toughening, and increasing the tensile strength of the products obtained, and especially of filaments made therefrom. From 10 to 20% of these plasticizers increases the flexibility and lowers the hardness but the tensile strength generally remains above that of products formed of the unplasticized copolymers. Above 20%, flexibility increases rapidly and the tensile strength decreases, the product taking on a certain amount of elasticity akin to that of rubber.

The plasticizers of this invention are—

Thymol
Isothymol
Orcinol
Methylene di-salicylic acid
2-methyl-3,5-di-isopropyl phenol
Mixtures of alkylated phenols
p-Chlorophenol
2,4-dichlorophenol
1,3-dihydroxy-4-chlorobenzene The composition may be formed in any suitable manner. The copolymer in powdered form may be mixed with the plasticizer in liquid or powdered form and then the mixture may either be preliminarily molded into pellets under suitable heat and pressure or the mixture may be milled, such as in the conventional heated two-roll rubber mill. Temperatures of about 80 to 160° C. are generally useful at this stage. After thus obtaining thorough and uniform distribution of the plasticizer through the composition, it may be used for the ultimate molding or extruding in the form of small pellets or ground into powder. The temperature of final molding or extruding is generally dependent upon the temperature at which the preliminary working, i. e. milling or molding, is performed; the higher the latter, the higher the temperature of final forming.

In the following examples, the invention is illustrated by the melt-spinning of filaments, though it is to be understood the composition finds general use for molding or extruding numerous other products:

Example I

A powdered copolymer (92.5 parts by weight) of vinyl chloride and acrylonitrile containing 49% acrylonitrile having an average molecular weight of about 20,000, and an incipient softening temperature of about 130° C. was mixed with 7½ parts by weight of orcinol and the mixture was preliminarily molded at 140° C. The resulting compound had a Rockwell hardness of M-85 and was extruded at about 180° C. through the orifices (of 20 mils diameter) of a spinneret to produce filaments having a tensile strength of 0.94 gram per denier and an extensibility of 18.5%. Thereafter, the filaments were stretched to effect a 25% elongation, yielding a product having a strength of 1.13 grams per denier and an extensibility of 11.3%.

In comparison, an unplasticized sample of powdered copolymer does not become welded at temperatures of 130 to 150° C. Heating it to a higher temperature causes rapid decomposition and the molded products obtained were too brittle to test for hardness. The plasticizer has a marked stabilizing effect upon the copolymer, allowing it to be heated to a highly fluid condition at temperatures of 180 to 200° C. without detrimental decomposition.

Example II

A mixture of 5 parts of isothymol and 95 parts of the copolymer of Example I was worked up by molding at 125° C. at 3500 pounds per square inch. The mixture was then pulverized and extruded at a temperature of about 200° C. through the orifices of a spinneret. The filaments produced had a tensile strength of 0.94 gram per denier and an extensibility of 7%.

Example III

A mixture of 7.5 parts isothymol and 92.5 parts of the copolymer of Example I was worked up by molding at 100° C., giving a product having a Rockwell hardness of M-79. The pre-mold mass was pulverized and extruded at 180° C. to produce filaments which, after 25% stretching, had a tensile strength of 1.63 and an extensibility of 8.5%.

Example IV

A mixture of 5 parts of 1,3-dihydroxy-4-chlorophenol and 95 parts of the copolymer of Example I was pre-molded at 150° C. The pre-molded product had a Rockwell hardness of M-85, was crushed, and was extruded at about 200° C. to form filaments which had a tensile strength of 0.79 gram per denier and an extensibility of 7.3%. By after-stretching the strength was readily raised to 0.9 gram per denier, the extensibility being then 6.3%.

Example V

A mixture of 5 parts of orcinol and 95 parts of the copolymer of Example I was preliminarily worked up at 140° C. Filaments were obtained by extrusion at 190° C. and they had a tensile strength of 1.12 grams per denier and 16.3% extensibility.

Example VI

A mixture of 2.5 parts of isothymol and 97.5 parts of the copolymer of Example I was preliminarily worked up at a temperature of 155° C. and was extruded at 185° C. to form filaments which were smooth and tough.

Example VII

A mixture of 10 parts of thymol and 90 parts of a copolymer of vinyl with acrylonitrile containing about 40% acrylonitrile was worked up by milling at 100° C. The fused product was extruded at 155° C. to form filaments having greater flexibility than the filaments of the preceding examples, but still having ample strength and toughness.

Example VIII

A mixture of 15 parts of 2-methyl-3, 5-di-isopropyl phenol and 85 parts of a copolymer of vinyl chloride and acrylonitrile having a content of 55% acrylonitrile was worked up by milling at 120° C. The product was crushed and extruded into filaments having excellent flexibility.

The filaments thus obtained find especially advantageous usage in the production of stabilized woven, knitted, braided, or other fabrics and felt-like products. Thus the filaments, in continuous form or as staple fibers, with or without such non-thermoplastic fibers as cotton, rayon, wool, silk, linen and the like (or, if desired, with thermoplastic fibers having higher softening temperatures) may be converted into yarns, and the yarns, after being woven, knitted, braided or otherwise fabricated, can be subjected to heat, with or without pressure, to effect bonding of the plasticized vinyl chloride-acrylonitrile fibers (because of being rendered adhesive by their thermoplasticity) to themselves and any adjacent fibers where they intermesh. Similarly paper-like and felt-like products may be made from staple fibers of the plasticized vinyl chloride-acrylonitrile copolymers, cut to suitable lengths, and mixed or not with other fibers of non-thermoplastic properties (or, if desired, with thermoplastic fibers having higher softening temperatures). After forming mats of the fiber, by carding, blowing, and the like, the copolymer fibers may be rendered adhesive by heat and the mats may be compacted to any desired density to obtain products of more or less stiffness or flexibility and softness.

The copolymer filaments and fibers are highly resistant to most organic solvents and also to acid and alkaline solutions. They are free of attack by mildew and bacteria in general and have undiminished strength and flexibility in humid atmospheres or even when soaked in water over long periods of time. The fibers and filaments are therefore useful for making filter fabrics, dializer membranes, fishing line leaders, strings for tennis rackets, violins and other musical instruments, surgical sutures, as well as for making fabrics for industrial and textile uses generally.

It is to be understood that changes and variations may be made therein without departing from the spirit or scope of the invention as defined by the appended claims.

I claim:

1. A composition and molded and extruded products made therefrom including filaments and the like comprising a copolymer of vinyl chloride with acrylonitrile having a molecular weight of 10,000 to 25,000 containing between 10 and 55% of acrylonitrile; and a compound selected from the group consisting of Thymol
Isothymol
Orcinol
Methylene di-salicylic acid
2-methyl-3,5-di-isopropyl phenol
Mixtures of alkylated phenols
p-Chlorophenol
2,4-dichlorophenol
1,3-dihydroxy-4-chlorobenzene in an amount of 2% to 20% of the combined weights of copolymer and said compound.

2. A composition and molded and extruded products made therefrom including filaments and the like comprising a copolymer of vinyl chloride with acrylonitrile having a molecular weight of 10,000 to 25,000 containing between 35 and 55% of acrylonitrile; and a compound selected from the group consisting of

Thymol
Isothymol
Orcinol
Methylene di-salicylic acid
2-methyl-3,5-di-isopropyl phenol
Mixtures of alkylated phenols
p-Chlorophenol
2,4-dichlorophenol
1,3-dihydroxy-4-chlorobenzene in an amount of 2 to 10% of the combined weight of copolymer and said compound.

3. A composition and molded and extruded products made therefrom including filaments and the like comprising a copolymer of vinyl chloride with acrylonitrile having a molecular weight of 10,000 to 25,000 containing between 35 and 55% of acrylonitrile; and isothymol in an amount of 2 to 20% of the combined weight of copolymer and isothymol.

4. A composition and molded and extruded products made therefrom including filaments and the like comprising a copolymer of vinyl chloride with acrylonitrile having a molecular weight of 10,000 to 25,000 containing between 35 and 55% of acrylonitrile; and orcinol in an amount of 2 to 20% of the combined weight of copolymer and orcinol.

5. A composition and molded and extruded products made therefrom including filaments and the like comprising a copolymer of vinyl chloride with acrylonitrile having a molecular weight of 10,000 to 25,000 containing between 35 and 55% of acrylonitrile; and thymol in an amount of 2 to 20% of the combined weight of copolymer and thymol.

6. A composition and molded and extruded products made therefrom including filaments and the like comprising a copolymer of vinyl chloride with acrylonitrile having a molecular weight of 10,000 to 25,000 containing between 35 and 55% of acrylonitrile; and isothymol in an amount of 2 to 10% of the combined weights of copolymer and phenol derivative.

7. A composition and molded and extruded products made therefrom including filaments and the like comprising a copolymer of vinyl chloride with acrylonitrile having a molecular weight of 10,000 to 25,000 containing between 35 and 55% of acrylonitrile; and orcinol in an amount of 2 to 10% of the combined weights of copolymer and phenol derivative.

8. A composition and molded and extruded products made therefrom including filaments and the like comprising a copolymer of vinyl chloride with acrylonitrile having a molecular weight of 10,000 to 25,000 containing between 35 and 55% of acrylonitrile; and thymol in an amount of 2 to 10% of the combined weights of copolymer and phenol derivative.

9. A composition and molded and extruded products made therefrom including filaments and the like comprising a copolymer of vinyl chloride with acrylonitrile having a molecular weight of 10,000 to 25,000 containing between 10 and 55% of acrylonitrile; and isothymol in an amount of 2 to 10% of the combined weight thereof with the copolymer.

CECIL W. GAYLER.

REFERENCES CITED

The following references are of record in the file of this patent:

UNITED STATES PATENTS

| Number | Name | Date |
|---|---|---|
| 2,057,690 | Moss | Oct. 20, 1936 |
| 2,306,880 | Heyman | Dec. 29, 1942 |
| 2,344,489 | Boyer et al. | Mar. 21, 1944 |
| 2,360,864 | Fryling | Oct. 24, 1944 |
| 2,420,330 | Shriver et al. | May 13, 1947 |